United States Patent
Takeda et al.

(10) Patent No.: US 11,983,818 B2
(45) Date of Patent: May 14, 2024

(54) MEASUREMENT SYSTEM AND STORAGE MEDIUM STORING MEASUREMENT PROGRAM

(71) Applicant: KABUSHIKI KAISHA TOSHIBA, Tokyo (JP)

(72) Inventors: Yu Takeda, Yokohama (JP); Hiroaki Nakamura, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 151 days.

(21) Appl. No.: 17/653,936

(22) Filed: Mar. 8, 2022

(65) Prior Publication Data

US 2023/0043369 A1 Feb. 9, 2023

(30) Foreign Application Priority Data

Aug. 3, 2021 (JP) ................. 2021-127420

(51) Int. Cl.
 *G06T 17/20* (2006.01)
 *G06T 19/20* (2011.01)
 *G06V 10/75* (2022.01)

(52) U.S. Cl.
 CPC ............ *G06T 17/205* (2013.01); *G06T 19/20* (2013.01); *G06V 10/751* (2022.01); *G06T 2219/2021* (2013.01)

(58) Field of Classification Search
 CPC .................. G06T 17/205; G06T 19/20; G06T 2219/2021; G06V 10/751
 See application file for complete search history.

(56) References Cited

U.S. PATENT DOCUMENTS 10,210,628 B2 * 2/2019 Domae .................... G06T 7/70
10,803,615 B2 * 10/2020 Konishi ................ G06V 20/64
(Continued)

FOREIGN PATENT DOCUMENTS

JP 2002-8014 A 1/2002
JP 2010-112729 A 5/2010
(Continued)

OTHER PUBLICATIONS

Sarode, V. et al. ,"MaskNet: A Fully-Convolutional Network to Estimate Inlier Points" arXiv:2010.09185v1 , 2020, 10 pages.
(Continued)

*Primary Examiner* — Phuc N Doan
(74) *Attorney, Agent, or Firm* — Maier & Maier, PLLC

(57) ABSTRACT

A measurement system includes a processor. Based on information measured by a camera that takes an image of a measurement target and an auxiliary object arranged on the measurement target, the processor acquires first point cloud data representing a three-dimensional geometry of the measurement target including the auxiliary object. Based on the first point cloud data and second point cloud data that is known and that represents a three-dimensional geometry of the measurement target, the processor eliminates point cloud data of the auxiliary object from the first point cloud data. The processor compares the first point cloud data, from which the point cloud data of the auxiliary object has been eliminated, with the second point cloud data. The processor displays information relating to a result of comparison on a display device.

9 Claims, 5 Drawing Sheets

(56) References Cited

U.S. PATENT DOCUMENTS

| | | | |
|---|---|---|---|
| 10,810,699 B2* | 10/2020 | Komeichi | G06T 3/0081 |
| 2012/0256916 A1* | 10/2012 | Kitamura | G01S 17/89 |
| | | | 345/419 |
| 2013/0148851 A1* | 6/2013 | Leung | G06T 7/74 |
| | | | 382/103 |
| 2016/0364905 A1* | 12/2016 | Jung | G06T 17/20 |
| 2021/0166418 A1* | 6/2021 | Zhou | G06T 7/73 |
| 2022/0068019 A1* | 3/2022 | Ito | G01S 17/86 |
| 2022/0270272 A1 | 8/2022 | Nakamura | |

FOREIGN PATENT DOCUMENTS

| | | | |
|---|---|---|---|
| JP | 2012-33119 A | | 2/2012 |
| JP | 2017-106749 A | | 6/2017 |
| JP | 2018179975 A | * | 11/2018 |
| JP | 2022128087 A | | 9/2022 |

OTHER PUBLICATIONS

Hsgucci, "Color detection program", https://qlita.com/hsgucci/items/e9a65d4fa3d279e4219e, 2021, 57 pages ( with English Machine Translation).

* cited by examiner

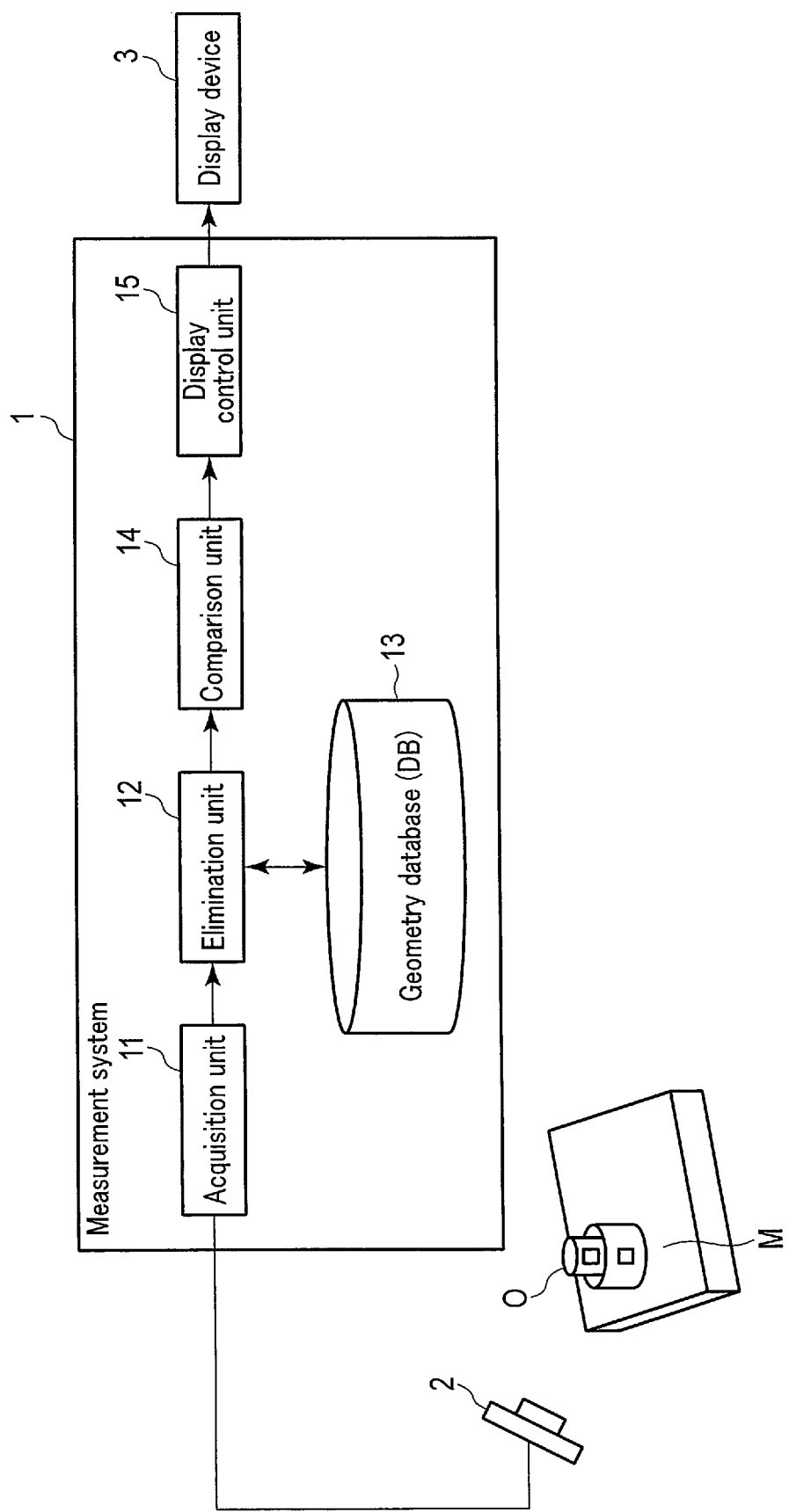
F I G. 1

MEASUREMENT SYSTEM AND STORAGE MEDIUM STORING MEASUREMENT PROGRAM

CROSS-REFERENCE TO RELATED APPLICATIONS

This application is based upon and claims the benefit of priority from Japanese Patent Application No. 2021-127420, filed Aug. 3, 2021, the entire contents of which are incorporated herein by reference.

FIELD

Embodiments described herein relate generally to a measurement system and a storage medium storing a measurement program.

BACKGROUND

As a method for matching the data of two point clouds of the same measurement target, the Iterative Closest Point (ICP) algorithm has been known. A matching method such as ICP may be adopted for comparison of images, for example to check whether components are accurately assembled. In order to enhance the accuracy and efficiency in the point cloud data matching, an auxiliary object such as a marker may be attached to a measurement target as a reference.

Auxiliary objects including markers are not inherent in a measurement target. The point cloud of a reference such as a marker in the measured point cloud data often generates noise when matching the measured point cloud with the designed point cloud representing an ideal form of the measurement target, such as a point cloud created from a design 3D-CAD or the like.

BRIEF DESCRIPTION OF THE DRAWINGS

FIG. 1 is a block diagram showing an exemplary configuration of a measurement system according to an embodiment.

DETAILED DESCRIPTION

Figure 2:
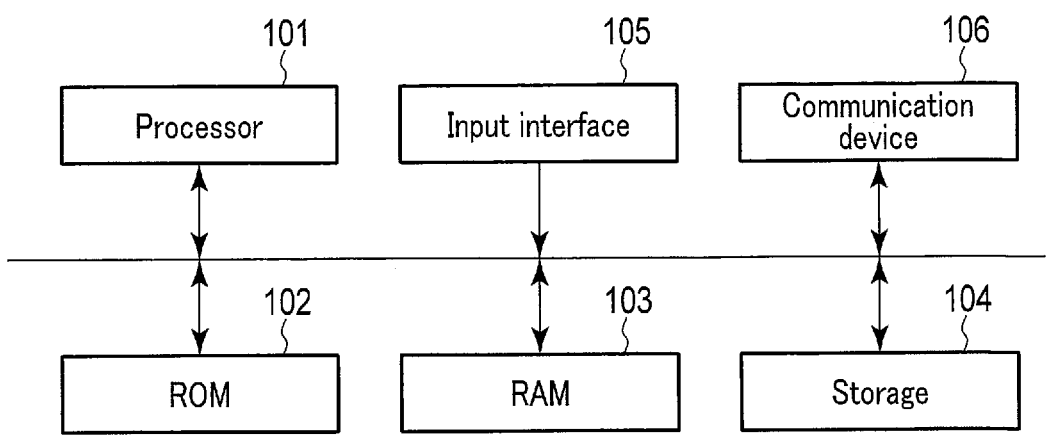
FIG. 2 is a diagram showing an exemplary hardware configuration of the measurement system.

In general, according to one embodiment, a measurement system includes a processor including hardware. Based on information measured by a camera that takes an image of a measurement target and an auxiliary object arranged on the measurement target, the processor acquires first point cloud data representing a three-dimensional geometry of the measurement target including the auxiliary object. Based on the first point cloud data and second point cloud data that is known and that represents a three-dimensional geometry of the measurement target, the processor eliminates point cloud data of the auxiliary object from the first point cloud data. The processor compares the first point cloud data, from which the point cloud data of the auxiliary object has been eliminated, with the second point cloud data. The processor displays information relating to a result of comparison on a display device.

Hereinafter, embodiments will be described with reference to the drawings. FIG. 1 is a block diagram showing an exemplary configuration of a measurement system according to an embodiment. A measurement system 1 may be employed for measurement of a three-dimensional geometry of a measurement target.

The measurement system 1 according to the present embodiment compares the information of the three-dimensional geometry of a measurement target O measured by a camera 2 with prescribed information of the ideal three-dimensional geometry of the measurement target O, and presents the comparison result to the user.

As illustrated in FIG. 1, the measurement system 1 includes an acquisition unit 11, an elimination unit 12, a geometry database 13, a comparison unit 14, and a display control unit 15. The measurement system 1 is configured to be communicable with the camera 2. The communication between the measurement system 1 and camera 2 may be established in a wireless or wired manner. The measurement system 1 is also configured to be communicable with the display device 3. The communication between the measurement system 1 and display device 3 may be established in a wireless or wired manner.

The camera 2 is configured to measure information relating to a point cloud of the measurement target together with information relating to a point cloud of a marker arranged on the measurement target. The camera may be an RGB-D camera. The RGB-D camera is configured to measure an RGB-D image. An RGB-D image includes a depth image and a color image (RGB color image). A depth image has pixel values corresponding to the depths of respective points of a measurement target. A color image has pixel values corresponding to RGB values of the respective points of the measurement target.

A marker M is a known marker arranged in advance at a specific position of the measurement target O. In accordance with the angular fields of the camera 2, multiple markers M are arranged on two or more surfaces of the measurement target O. The markers M are auxiliary objects used as references when combining data of point clouds.

The display device 3 may be a liquid crystal display or an organic EL display. The display device 3 is configured to display various types of images based on the data transferred from the measurement system 1.

The acquisition unit 11 is configured to acquire, for example from a depth image, measurement point cloud data representing the three-dimensional geometry of the measurement target O that includes markers M. The acquisition unit 11 is further configured to combine the measurement point cloud data of different directions acquired as a result of taking images of the measurement target O from multiple directions by the camera 2, by referring to the markers M prearranged on the measurement target O. Using a matching method such as the iterative closest point (ICP) or coherent point drift (CPD), the acquisition unit 11 associates the measurement point cloud data with a color image. That is, the acquisition unit 11 associates color information with the respective points that form the measurement point cloud data.

The elimination unit 12 is configured to compare the measurement point cloud data of the measurement target O including the markers M, where the data is generated by the acquisition unit 11, with ideal point cloud data stored in the geometry database 13, where the data has been prepared based on the designed three-dimensional geometry of the measurement target O, and eliminate the point cloud data of the markers M from the measurement point cloud data. The elimination unit 12 may eliminate the point cloud data of the markers M, by adopting a trained model that uses MaskNet, for example. The MaskNet is a machine-learning-based algorithm for training a mask, with which the feature amounts of an input point cloud and a reference point cloud are extracted with the same weights and compared with each other, and a difference between these feature amounts obtained through the comparison are eliminated. According to the present embodiment, the measurement point cloud data serves as an input point cloud, while the ideal point cloud data based on the designed three-dimensional geometry serves as a reference point cloud. The measurement point cloud data includes the point cloud data of the markers M, while the ideal point cloud data does not include the point cloud data of the markers M. This allows the MaskNet to extract point cloud data without the point cloud data of the markers M. In this manner, the elimination unit 12 eliminates the point cloud data of the markers M from the original measurement point cloud data. The feature amounts used for the comparison of the point cloud data may be the values of the point cloud dimension, or values of the colors or reflection brightness corresponding to the point cloud data. The trained model according to the present embodiment is not necessarily MaskNet, but any trained model that can extract the difference between the measurement point cloud data and ideal point cloud data can be adopted.

The geometry database 13 stores therein the designed three-dimensional geometry information of the measurement target O. The designed three-dimensional geometry information may be the drawing data of the measurement target O formed by 3D computer-aided design (CAD), representing the ideal form of the measurement target O. The designed three-dimensional geometry information, however, is not limited to the drawing data, but may be data of any point cloud or other data that is convertible to point cloud data. The geometry database 13 may be provided outside the measurement system 1. If this is the case, the elimination unit 12 of the measurement system 1 is configured to acquire information from the geometry database 13, as needed. The designed three-dimensional geometry information may be input by the user into the measurement system 1 without being entered into the geometry database 13.

The comparison unit 14 is configured to compare the measurement point cloud data, from which the point cloud data of the marker M has been eliminated, with the ideal point cloud data based on the three-dimensional geometry information stored in the geometry database 13. In particular, the comparison unit 14 compares the measurement point cloud data with the ideal point cloud data, and matches the two sets of point cloud data for mutual alignment. For matching of the point cloud data, a method such as ICP or CPD may be adopted.

The display control unit 15 is configured to display information relating to the geometric comparison results on the display device 3. The information relating to the geometric comparison results may be an image based on the measurement point cloud data acquired by the camera 2, upon which an image based on the ideal point cloud data stored in the geometry database 13 is superimposed. The display control unit 15 may generate a 3D model of the measurement target O viewed from a given viewpoint based, for example, on the position and attitude of the camera 2, by associating the RGB image measured by the camera 2 with the point cloud data. Then, the display control unit 15 superimposes the 3D model based on the designed three-dimensional geometry information on the generated 3D model of the measurement target O, and displays the resultant model on the display device 3.

FIG. 2 is a diagram showing an exemplary hardware configuration of the measurement system 1. The measurement system 1 may be any kind of terminal device such as a personal computer (PC) or a tablet terminal. As illustrated in FIG. 2, the measurement system 1 includes, as its hardware configuration, a processor 101, a ROM 102, a RAM 103, a storage 104, an input interface 105, and a communication device 106.

The processor 101 is configured to control the overall operation of the measurement system 1. By executing a program stored in the storage 104, the processor 101 functions as the acquisition unit 11, elimination unit 12, comparison unit 14, and display control unit 15. The processor 101 may be a central processing unit (CPU). The processor 101 may also be a micro-processing unit (MPU), a graphics processing unit (GPU), an application specific integrated circuit (ASIC), a field programmable gate array (FPGA), or the like. The processor 101 may be a single CPU, or multiple CPUs.

The read-only memory (ROM) 102 is a non-volatile memory. The ROM 102 stores a startup program and the like for the measurement system 1. The random-access memory (RAM) 103 is a volatile memory. The RAM 103 may be used as a working memory, for instance at the time of the processing at the processor 101.

The storage 104 may be a hard disk drive or solid state drive. The storage 104 stores various programs such as the measurement program which are to be executed by the processor 101. The storage 104 may store the geometry database 13. The geometry database 13, however, does not always need to be stored in the storage 104.

The input interface 105 includes input devices such as a touch panel, a keyboard, and a mouse. When the input device of the input interface 105 is manipulated, a signal corresponding to the manipulation is input to the processor 101. In response to this signal, the processor 101 executes various types of processing.

The communication device 106 enables the measurement system 1 to communicate with external devices such as the camera 2 and display device 3. The communication device 106 may be a device for wired communication or for wireless communication.

Figure 3A:
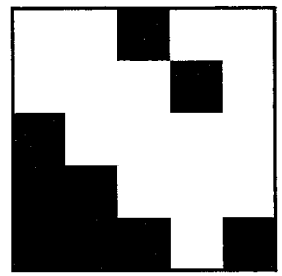
FIG. 3A is a diagram showing an exemplary marker.
Figure 3B:
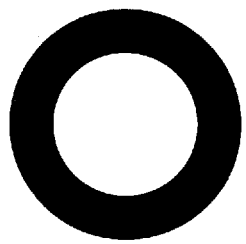
FIG. 3B is a diagram showing another exemplary marker.
Figure 3C:
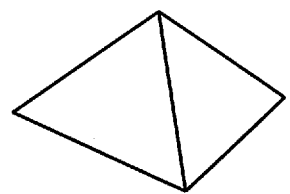
FIG. 3C is a diagram showing another exemplary marker.

Next, the marker M will be described. According to the present embodiment, the marker M is used as a reference when combining the measurement point cloud data obtained by imaging from different directions. The marker M may be any marker that can be recognized on a depth image or color image acquired by the camera 2. The marker M may be an augmented reality (AR) marker illustrated in FIG. 3A. The AR marker may include a black-and-white pattern and represent specific information in accordance with the pattern. According to the present embodiment, the AR marker may include identification information of the marker. The marker M may be a sticker marker, as illustrated in FIG. 3B. The sticker marker of FIG. 3B may include concentric circles. With the center of the circles in the sticker marker being recognized from the images, the position of the sticker marker of FIG. 3B can be accurately recognized in the image. This improves the accuracy of combining the measurement point cloud data. The marker M may be a physical marker as illustrated in FIG. 3C. The physical marker may have a shape that completely differs from that of the measurement target O. The physical marker illustrated in FIG.

3C has a quadrangular pyramid shape. In the physical marker of FIG. 3C, since a specific shape that would not be present in the measurement target O can be observed in an image, the position of the marker in the image can be accurately recognized. This improves the accuracy of combining the measurement point cloud data.

Here, a feature that differs from that of the measurement target O may be imparted to the marker M. Examples of such features may include a surface color, a pattern, and a reflection intensity. In case of a color, the marker M may have a color that significantly differs from that of the measurement target O, demonstrating a complementary relationship with the color of the measurement target O. For instance, according to the present embodiment, RGB values are assigned to the respective points that constitute the measurement point cloud data. If the marker M has a color different from that of the measurement target O and if the ideal point cloud data also has information of RGB values, the coordinates of the point cloud data of the marker M can be identified from the differences in the colors. Similarly, differences in patterns and reflection intensities also appear as differences in different sets of point cloud data, and the coordinates of the point cloud data of the marker M can be identified from these features. Furthermore, the coordinates of the point cloud data of the marker M can be identified from the aforementioned physical marker having a characteristic shape. By adopting both elimination of the point cloud data of the marker M using a trained model and the elimination of the point cloud data of the marker M using information of the features, the accuracy in elimination of the point cloud data of the marker M can be further improved. The elimination of the point cloud data of the marker M using the information of the features does not always need to be adopted together with the elimination of the point cloud data of the marker M using a trained model, but may be solely adopted.

Figure 4:
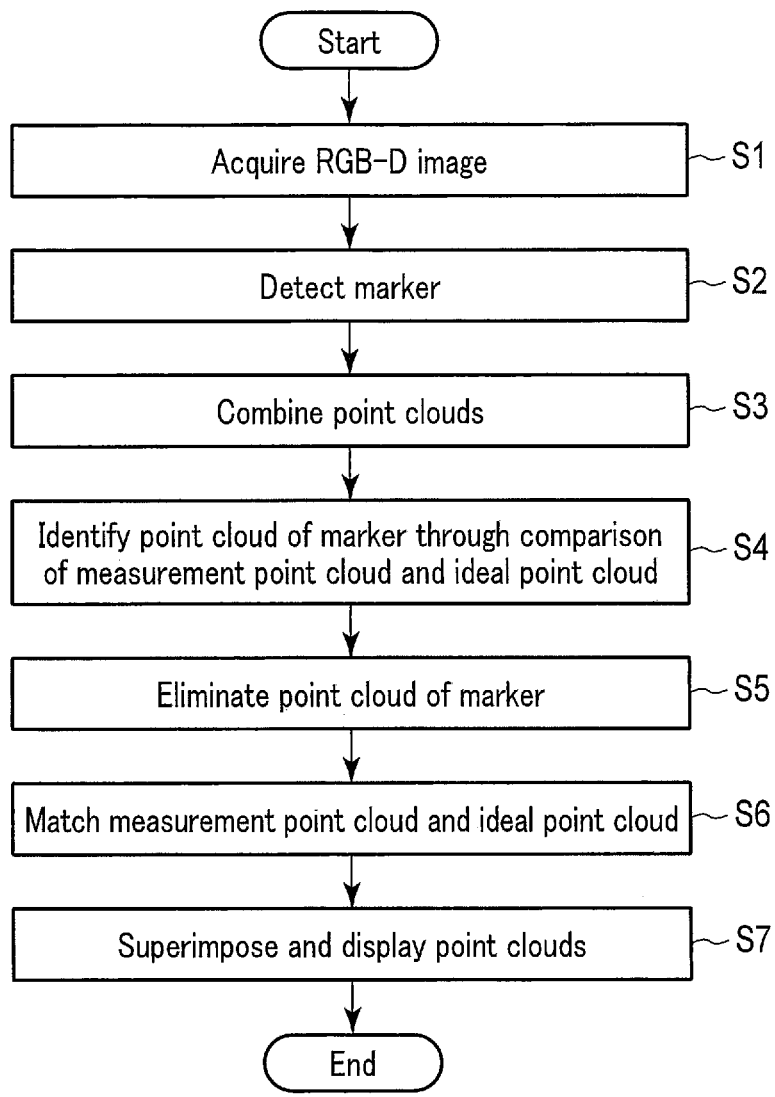
FIG. 4 is a flowchart showing the operation of the measurement system.

Next, the operation of the measurement system 1 according to the present embodiment will be explained. FIG. 4 is a flowchart showing the operation of the measurement system 1. The processing in FIG. 4 is executed by the processor 101. An explanation of the following example is provided, in which an RGB-D camera is adopted as the camera 2, the 3D CAD data of the measurement target O is adopted as the designed three-dimensional geometry information, and an AR marker is adopted as the marker M. As mentioned earlier, however, the camera 2 does not need to be an RGB-D camera, and the designed three-dimensional geometry information does not need to be the 3D CAD data of the measurement target O. The marker M also does not need to be an AR marker.

At step S1, the processor 101 acquires RGB-D images of the measurement target O including a marker M from the camera 2, which has taken images of the measurement target O from multiple directions. The processor 101 associates the color images with the measurement point cloud data generated based on the depth image using the ICP method or the like.

At step S2, the processor 101 detects a marker M from the color images acquired from the camera 2. The processor 101 may convert a color image acquired by the camera 2 to a gray-scale image, further convert this gray-scale image to a black-and-white binary image, and compare this black-and-white binary image with a prestored pattern of the marker M to detect the marker M. The detection of the marker M, however, is not limited thereto.

At step S3, the processor 101 combines the different sets of measurement point cloud data of the different directions, based on the marker M.

At step S4, the processor 101 inputs the measurement point cloud data and the ideal point cloud data of the measurement target O based on the 3D CAD data into the trained model, which is configured to mask the difference between the measurement point cloud data and the ideal point cloud data, and thereby identifies the point cloud data of the marker M in the measurement point cloud data. As mentioned earlier, if a feature such as color is imparted to the marker M, the processor 101 may identify the point cloud data of the marker M by comparing the colors or the like of the measurement point cloud data and the ideal point cloud data. For instance, the processor 101 may compare the measurement point cloud data with the ideal point cloud data, and extract the point cloud data of a specific color that is present only in the point cloud data of the measurement target O as the point cloud data of the marker M. Here, the processor 101 may identify the point cloud data of the marker M with a trained model configured to mask the difference between the measurement point cloud data and ideal point cloud data, and further narrow down the identification of the point cloud data of the marker M in accordance with a feature such as color.

At step S5, the processor 101 eliminates the point cloud data of the marker M from the measurement point cloud data.

At step S6, the processor 101 matches the measurement point cloud data from which the point cloud data of the marker M has been eliminated with the ideal point cloud data to realize positional alignment. The matching may be performed based on the ICP method and so on.

At step S7, the processor 101 generates a three-dimensional image of the measurement target O based on the measurement point cloud data. Then, the processor 101 superimposes a three-dimensional image of the measurement target O based on the measurement point cloud data and a three-dimensional image of the measurement target O based on the 3D CAD data, and displays the resultant image on the display device 3. Here, the processor 101 may perform highlighting by adding a color to a portion that differs between the three-dimensional image of the measurement target O of the measurement point cloud data and the three-dimensional image of the measurement target O based on the 3D CAD data, or by using a different gray-scale value for such a portion. Thereafter, the processor 101 terminates the process in FIG. 4.

If the measurement target O is a component assembled into a device, it may be determined from the image displayed on the display device 3 as to whether the component is properly assembled into the device, through the comparison of a three-dimensional image of the measurement target O based on measurement point cloud data and the three-dimensional image of the measurement target O based on the 3D CAD data.

As explained above, the measurement point cloud data and ideal point cloud data are matched with each other after a point cloud of a marker, which is an auxiliary object, is eliminated from the measurement point cloud data, where the point cloud of the marker is needed when combining the measurement point cloud data obtained from multiple directions but is not needed when matching with the ideal point cloud data. Thus, matching of the measurement point cloud data and ideal point cloud data can be accurately achieved.

Modification Examples

Figure 5:
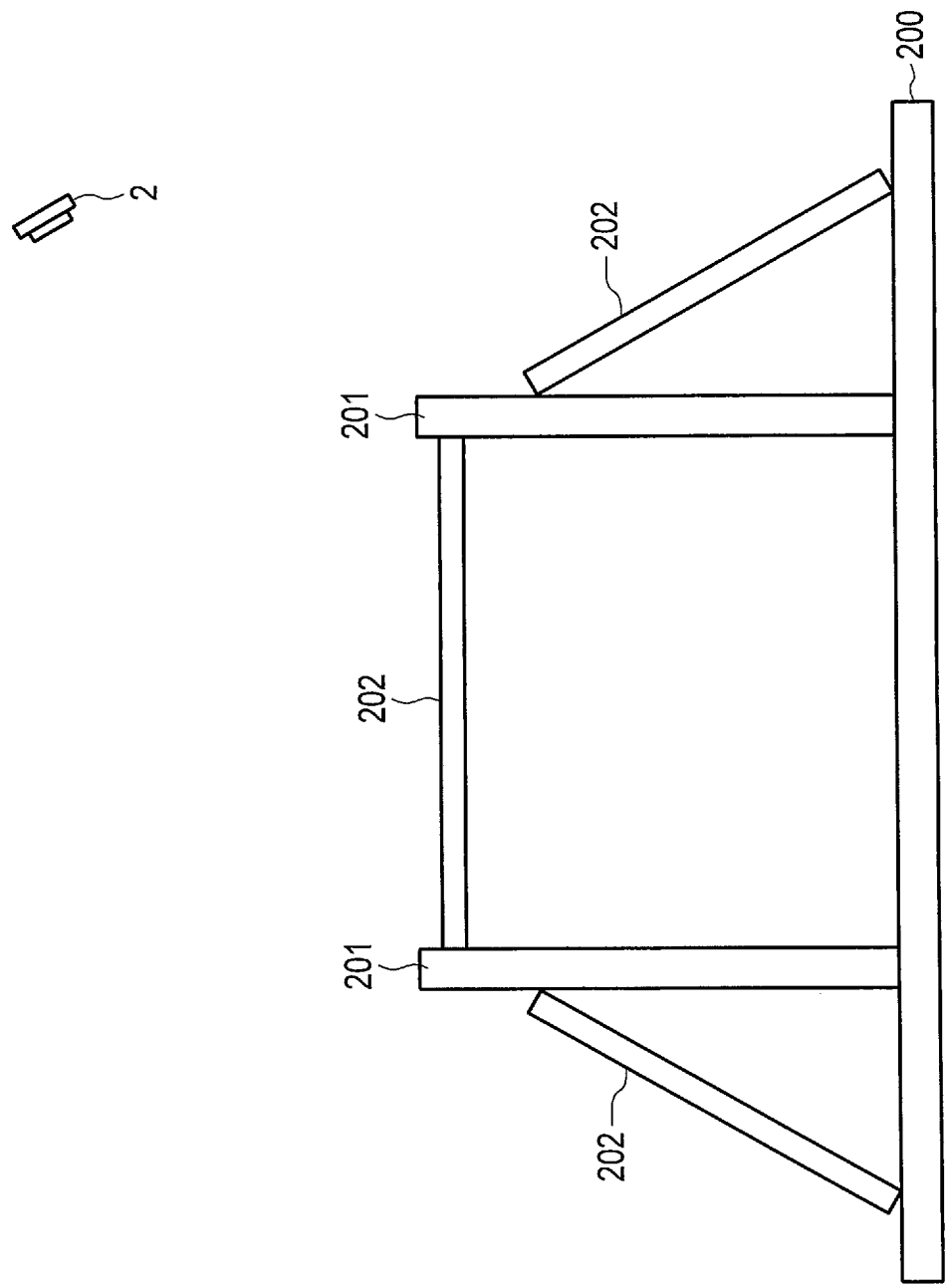
FIG. 5 is a diagram showing a modification example of an auxiliary object.

Modification examples of the present embodiment will be explained below. According to the embodiment, the auxiliary object arranged on the measurement point cloud data that is not needed for matching with the ideal point cloud data is a marker. The above method of the embodiment is equally applicable to an auxiliary object other than a marker. For instance, as illustrated in FIG. 5, in order to support an unstable measurement target 201 arranged on a base 200, the measurement target 201 may be supported by support materials 202 that serve as auxiliary objects. These support materials 202 are not needed when matching with the ideal point cloud data. The point cloud data of the support materials 202 can be eliminated with the method using a trained model or the method using the features of the support materials 202 as explained in the embodiment.

According to the present embodiment, an RGB-D camera is adopted as an example of the camera 2. The camera 2, however, is not limited to an RGB-D camera, and any camera can be adopted as long as the information relating to the point cloud of the measurement target can be measured. The camera 2 may be a stereo camera, for example. With a stereo camera, RGB value information can be given to individual points that constitute the point cloud data.

In the embodiment, the camera 2 may be integrated with the measurement system 1. If this is the case, the position and attitude of the camera 2 may be controlled by the measurement system 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A measurement system comprising a processor including hardware, the processor being configured to:
   based on information measured by a camera that takes an image of a measurement target and an auxiliary object arranged on the measurement target, acquire first point cloud data representing a three-dimensional geometry of the measurement target including the auxiliary object;
   based on the first point cloud data and second point cloud data that is known and that represents a three-dimensional geometry of the measurement target, eliminate point cloud data of the auxiliary object from the first point cloud data;
   compare the first point cloud data, from which the point cloud data of the auxiliary object has been eliminated, with the second point cloud data; and
   display information relating to a result of comparison on a display device.

2. The measurement system according to claim 1, wherein the processor inputs the first point cloud data and the second point cloud data into a trained model configured to mask a difference between the first point cloud data and the second point cloud data, and eliminates the difference between the first point cloud data and the second point cloud data as the point cloud data of the auxiliary object.

3. The measurement system according to claim 1, wherein the measurement target has a first value of a feature, and the auxiliary object has a second value of the feature that differs from the first value,
   each point cloud of the first point cloud data is associated with data of the feature, and
   the processor eliminates the point cloud data of the auxiliary object from the first point cloud data based on the data of the feature.

4. The measurement system according to claim 3, wherein the first value and the second value of the feature differ in color.

5. The measurement system according to claim 3, wherein the first value and the second value of the feature differ in surface pattern.

6. The measurement system according to claim 3, wherein the first value and the second value of the feature differ in surface reflection intensity.

7. The measurement system according to claim 3, wherein the first value and the second value of the feature differ in geometry.

8. The measurement system according to claim 1, wherein the auxiliary object is a marker.

9. A computer-readable non-transitory storage medium storing a measurement program that causes a computer to:
   based on information measured by a camera that takes an image of a measurement target and an auxiliary object arranged on the measurement target, acquire first point cloud data representing a three-dimensional geometry of the measurement target including the auxiliary object,
   based on the first point cloud data and second point cloud data that is known and that represents a three-dimensional geometry of the measurement target, eliminate point cloud data of the auxiliary object from the first point cloud data;
   compare the first point cloud data, from which the point cloud data of the auxiliary object has been eliminated, with the second point cloud data; and
   display information relating to a result of comparison on a display device.

* * * * *